(12) United States Patent
Farmer

(10) Patent No.: US 8,393,603 B2
(45) Date of Patent: Mar. 12, 2013

(54) INSTRUMENT PANEL ASSEMBLY FIXTURE

(75) Inventor: Shalette Farmer, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1231 days.

(21) Appl. No.: 12/194,909

(22) Filed: Aug. 20, 2008

(65) Prior Publication Data

US 2010/0045061 A1    Feb. 25, 2010

(51) Int. Cl.
*B25B 1/22* (2006.01)
(52) U.S. Cl. .............. 269/71; 269/17; 269/296
(58) Field of Classification Search .......... 29/238, 29/468; 269/52, 50, 71
See application file for complete search history.

(56) References Cited

U.S. PATENT DOCUMENTS

| 831,095 | A | * | 9/1906 | Polson | 269/52 |
| 1,500,264 | A | * | 7/1924 | Peterson | 269/52 |
| 1,761,366 | A | * | 6/1930 | Reutter | 269/101 |
| 2,205,532 | A | * | 6/1940 | Kohl | 269/52 |
| 2,542,616 | A | * | 2/1951 | Barrett | 408/62 |
| 2,724,175 | A | * | 11/1955 | Kjellberg | 269/52 |
| 3,038,356 | A | * | 6/1962 | Atzberger | 82/141 |
| 3,822,481 | A | * | 7/1974 | Doan | 33/371 |
| 3,986,383 | A | * | 10/1976 | Petteys | 72/393 |
| 4,133,115 | A | * | 1/1979 | Stockholm | 33/371 |
| 4,530,492 | A | * | 7/1985 | Bork | 269/17 |
| 4,708,041 | A | * | 11/1987 | Granger | 82/165 |
| 5,477,603 | A | * | 12/1995 | Kemichick | 29/468 |
| 5,692,738 | A | * | 12/1997 | DuVernay et al. | 269/82 |
| 5,964,457 | A | * | 10/1999 | Guajardo | 269/61 |
| 6,527,863 | B1 | * | 3/2003 | Pacetti et al. | 118/500 |
| 6,572,092 | B2 | * | 6/2003 | DuVernay et al. | 269/71 |
| 6,883,230 | B2 | * | 4/2005 | Matsumoto et al. | 29/822 |
| 7,338,238 | B2 | * | 3/2008 | Dorrian | 410/43 |
| 7,918,181 | B2 | * | 4/2011 | Tang et al. | 118/500 |
| 2008/0163959 | A1 | * | 7/2008 | Nemish | 148/425 |
| 2010/0045061 | A1 | * | 2/2010 | Farmer | 296/70 |

* cited by examiner

*Primary Examiner* — Lee D Wilson
*Assistant Examiner* — Jamal Daniel
(74) *Attorney, Agent, or Firm* — Mark Duell; Emerson Thomson Bennett

(57) ABSTRACT

The present invention generally relates to fixtures and methods for assembling automotive instrument panels. Some embodiments include a means for locating an instrument panel in a lateral direction and in a selected rotational direction. Some embodiments also include a means for locking the panel in specific desired rotational position. Furthermore, some embodiments may accommodate a wide variety of panel designs having variable lengths.

13 Claims, 5 Drawing Sheets

INSTRUMENT PANEL ASSEMBLY FIXTURE

I. BACKGROUND OF THE INVENTION

A. Field of Invention

The present invention generally relates to devices and methods for assembling automotive instrument panels.

B. Description of the Related Art

It is known in the automotive manufacturing arts to use fixtures for holding and positioning instrument panels during assembly processes. Prior fixtures had limited capacity for locating the panel in a lateral direction. Thus, positioning and handling the panel is difficult and often requires two or more people. Furthermore, prior fixtures have limited rotational controls, and often did not adequately prevent the panel from moving rotationally during assembly. Thus there is a need in the art for a fixture that overcomes these and/or other deficiencies.

II. BRIEF SUMMARY OF THE INVENTION

The present invention generally relates to an automotive instrument panel assembly fixture, comprising: a frame adapted to support an automotive instrument panel assembly; an opposing pair of panel assembly support cones comprising a first cone and a second cone and defining a longitudinal axis, and the cones each having a conical face opposing that of the other, and each having a flat face in vertically supported and rotatable relations with the frame, wherein the opposing pair of cones is adapted to engage a panel assembly at opposing ends of the panel; the first cone further comprising a movable panel engagement pin, wherein the panel engagement pin has a range of motion coextensive with the longitudinal axis; the second cone further comprising a panel assembly engagement key adapted to fix the rotational orientation of an instrument panel assembly relative to the key, and the key being in an adjustable fixed relation with the second cone, the flat face of the second cone having a plurality of indexing holes evenly spaced in a concentric circular pattern, wherein the flat face of the second circular cone has a plurality of ball plungers evenly spaced in a concentric circular pattern; an indexing member parallel to the flat face of the second cone, the indexing member having a plurality of holes evenly spaced in a concentric circular pattern the holes adapted to each receive a ball of a ball plunger in an indexing relation, wherein the indexing plate additionally includes an indexing hole adapted to align with any of the indexing holes defined by the flat face of the second cone and adapted to receive an indexing pin, the indexing pin holding the second cone in a fixed indexing relation to the indexing plate; and a rotatable crank member in a fixed relation with the second cone and adapted to cause rotation of the second cone about the longitudinal axis.

IV. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

V. DETAILED DESCRIPTION OF THE INVENTION

Figure 1:
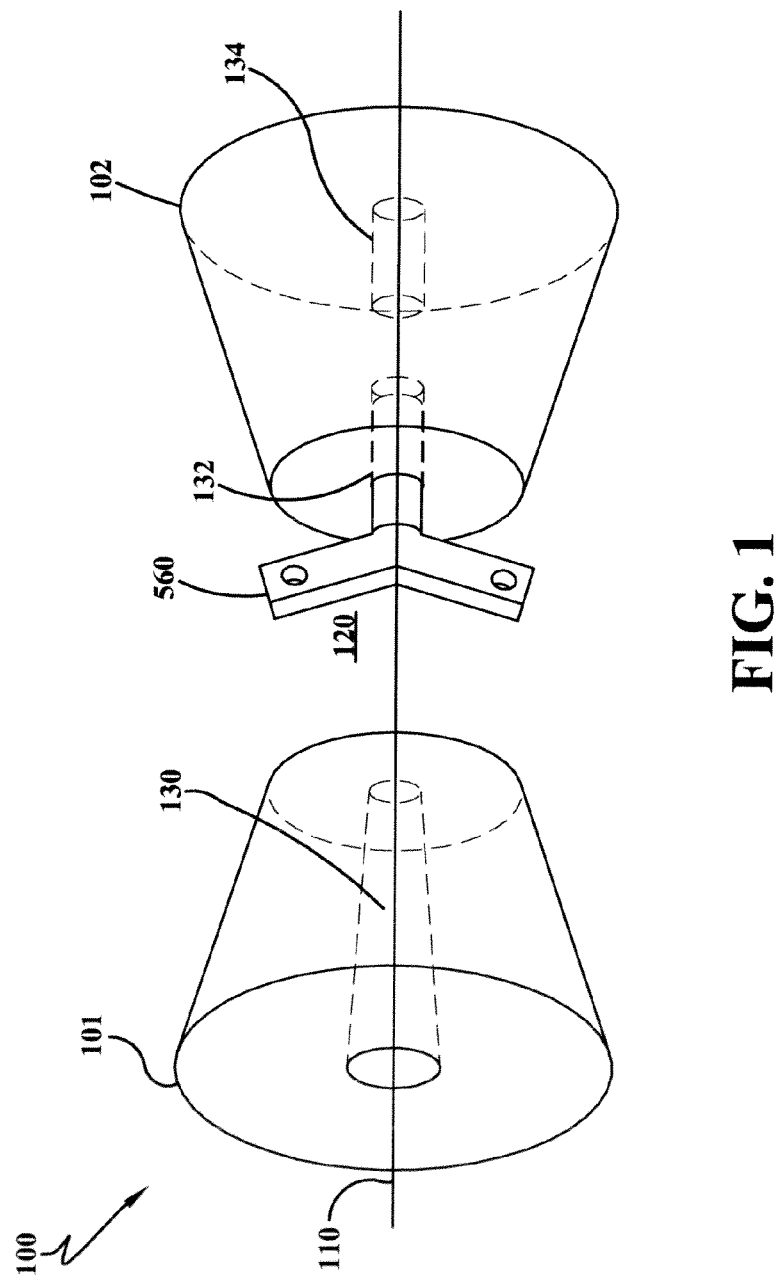
FIG. 1 is a drawing of a pair of opposing cone members.

Some embodiments relate to fixtures for assembling automotive instrument panel assemblies or related methods. According to some embodiments such a fixture can include a frame adapted to support an instrument panel assembly, a means for fixing the lateral position of the assembly, and a means for fixing the rotational position of the assembly about a longitudinal axis. According to some embodiments, the fixture can rotate the assembly incrementally using one or more indexing means. Furthermore, according to some embodiments the fixture is adapted to fix the lateral position of the assembly at any point in a continuous range of lateral motion.

A frame can take any of a wide variety of forms provided it is capable of supporting the load of an instrument panel assembly and other structures of the fixture. For instance, in some embodiments the frame comprises tubing having a rectangular cross section. Suitable tubing can have a variety of cross sectional dimensions such as, but not limited to, from about 0.5 inch to about 4 inches square. Furthermore, the frame can comprise any of a wide variety of materials including, but not limited to, steel, stainless steel, aluminum, aluminum alloy, organic polymer, or polymer composite materials. In some embodiments, the frame comprises a generally rectangular base having a pair of vertical support structures spaced apart and providing space for receiving an instrument panel assembly. Furthermore, is in some embodiments the frame can include a plurality of casters for conveniently positioning the device. Some embodiments can additionally include locks for the casters so that the position of the device can be fixed.

A means for fixing the lateral position of an instrument panel assembly can comprise a variety of components. According to some embodiments the means can comprise a pair of opposing conical structures mounted on opposing sides of the frame and vertically supported by the frame and defining a longitudinal axis, and further defining a working width for receiving an instrument panel assembly. Such conical structures can be in a rotational relation with the frame so that the conical structures are free to rotate while being vertically and/or laterally supported. Furthermore, the cones can comprise, for example, solid metal formed by appropriate machining processes, such as lathing, milling, drilling and the like.

A first cone can comprise a flat circular face generally facing a first side of the frame, and further comprise a conical face. The conical face may be truncated so that it does not come to a point, but rather defines a smaller flat face parallel to the other flat face. Furthermore, the first cone can define a bore passing through the center of mass of the cone and extending from the larger to the smaller flat face. Thus, the bore can be centered on the longitudinal axis. The bore can receive a means for adjusting the working width. For instance, in some embodiments, the bore can receive a plunger, a variable stroke plunger, a screw or the like or any combination thereof. According to such embodiments, the plunger's range of motion is coextensive with and along the longitudinal axis.

A second cone can be shaped similar to the first but oriented so that its flat face is directed toward the second side of the frame and its conical face is directed toward that of the first cone. The second cone can have at least one bore passing at least partially through the center of mass of the second cone and extending along the longitudinal axis. The smaller flat face can include a key member for receiving an instrument panel assembly and fixing its rotational orientation relative to the second cone. The specific shape, size and position of the key member are dictated by the configuration of the instrument panels that the fixture is designed to receive. In some embodiments the key member can occupy a bore defined by the second cone along the longitudinal axis and extending from the smaller flat face. Furthermore, the key may be permanently fixed or adjustable.

With further regard to the second cone, the larger flat face of the second cone can include a plurality of indexing members for indexing the rotational position of the second cone. In some embodiments, the indexing members can include one or more ball plungers. For instance, the second cone can be drilled to receive ball plungers arranged in a circular pattern concentric with the bore of the cone. According to such embodiments an indexing plate is advantageously parallel to the larger flat face and supported by the frame in a fixed relation. The indexing plate can be spaced apart from the face by a distance less than that by which the balls of the ball plungers protrude beyond the face. Furthermore, the indexing plate can define receiving holes adapted to mate with a protruding portion of the balls. In some embodiments the balls each simultaneously mate with receiving holes of the indexing plate.

In some embodiments, the larger face of the second cone can be additionally drilled to define indexing holes adapted to receive a removable indexing pin. The indexing holes can be arranged in a concentric circle having a diameter larger than the concentric circle defined by the ball plungers. Furthermore, the indexing holes may be adapted to align with a complementary indexing hole defined by the indexing plate. Accordingly, an indexing pin can be inserted through the indexing plate and seat in an indexing hole defined by the second cone. Thus, the rotational position of the second cone can be securely fixed relative to the indexing plate, and can only be moved by first removing the indexing pin.

In some embodiments, the second cone can also include a bore defined by the larger face. The bore can be adapted to receive, for instance, a drive shaft in a fixed relation. Accordingly, the second cone can be rotated about the longitudinal axis by rotating the drive shaft. Furthermore, in some embodiments the drive shaft additionally passes through a bore defined by the indexing plate. Thus, the drive shaft can be vertically supported by the indexing plate. One of skill in the art will recognize that a wide variety of methods and structures are known for rotating a drive shaft. Some structures include gears for gaining a mechanical advantage and reducing the force required to rotate the shaft. Some structures also include a crank handle for manually rotating the drive shaft. In some embodiments a ratcheting member may be included to force the fixture to rotate in a single direction. Moreover, such ratcheting members can be reversible or entirely disengageable. Still other embodiments can include a motor for automating rotation of the drive shaft. Some embodiments may include some or all of the foregoing structures related to rotating the drive shaft.

Some embodiments can operate as follows. A user can insert the indexing key through the appropriate hole in the indexing plate and engage an aligned indexing hole in the second cone. Accordingly, the rotational position of the second cone is fixed relative to the frame. However, the first cone is free to rotate about the longitudinal axis. The user can place an automobile instrument panel between the opposing cones of the fixture, and engage the key member of the second cone with the panel, thereby holding the panel in place while the variable stroke plunger of the first cone is adjusted to engage the panel. The user then simultaneously aligns the free end of the panel with the plunger, and adjusts the position of the plunger until it engages the panel. The panel is now fixed laterally and rotationally. The panel can be rotated by removing the indexing pin and turning the drive shaft. As the drive shaft turns, the seated balls compress their respective springs and recede into the flat face thus allowing the cone to rotate. The cone continues to rotate until the balls engage the next receiver holes in the indexing plate. The user can continue to rotate the panel until the desired orientation is achieved for assembling or otherwise working on the instrument panel. When the desired rotational position is achieved, the user can then reinsert the indexing pin to fix the position while he works on the panel.

Turning now to the Figures, FIG. 1 is a drawing of a pair of cones similar to those described herein. The cones 100 are disposed in an opposing relation with their smaller flat faces directed toward each other. Furthermore, the cones 100 define a longitudinal axis 110 comprising a straight line. The space between the cones 100 can be adapted to receive an instrument panel. First cone 101 defines a bore 130 passing through the cone from one flat face to the other and being coextensive with the longitudinal axis. The second cone 102 defines a first bore 132 coextensive with the longitudinal axis and adapted to receive a key member. The second cone 102 also defines a second bore 134 adapted to receive a drive shaft.

Figure 2:
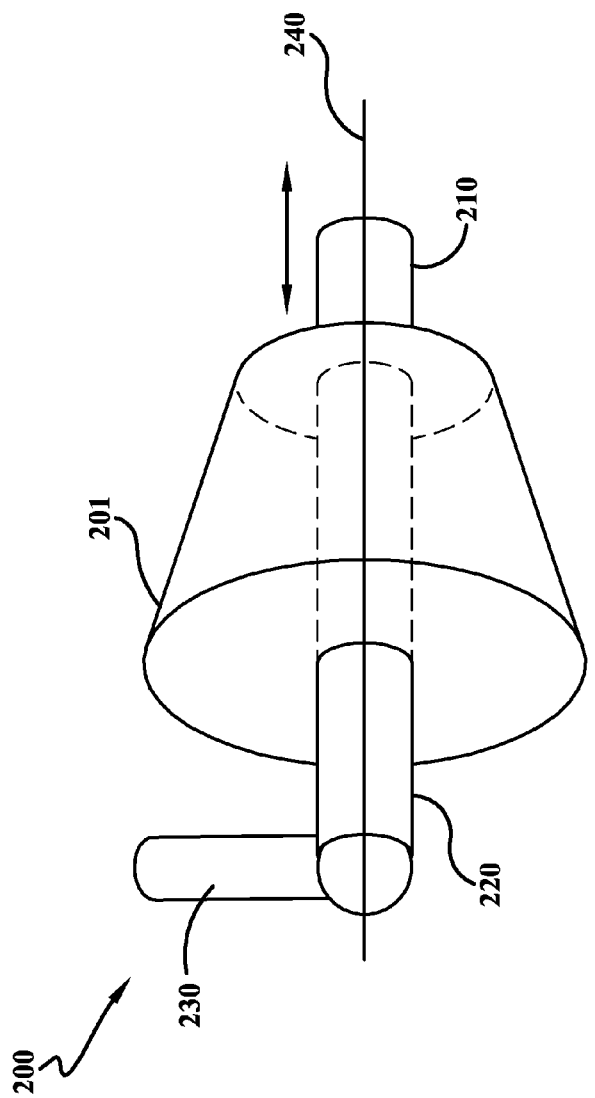
FIG. 2 is a drawing of a cone member having a variable stroke plunger.

FIG. 2 is a more detailed drawing of the first cone 201. The cone 201 includes a variable length plunger 220 having a plunger 210 and a handle 230 for extending and retracting the plunger 210. The plunger's 210 range of motion is along the longitudinal axis 240.

Figure 3:
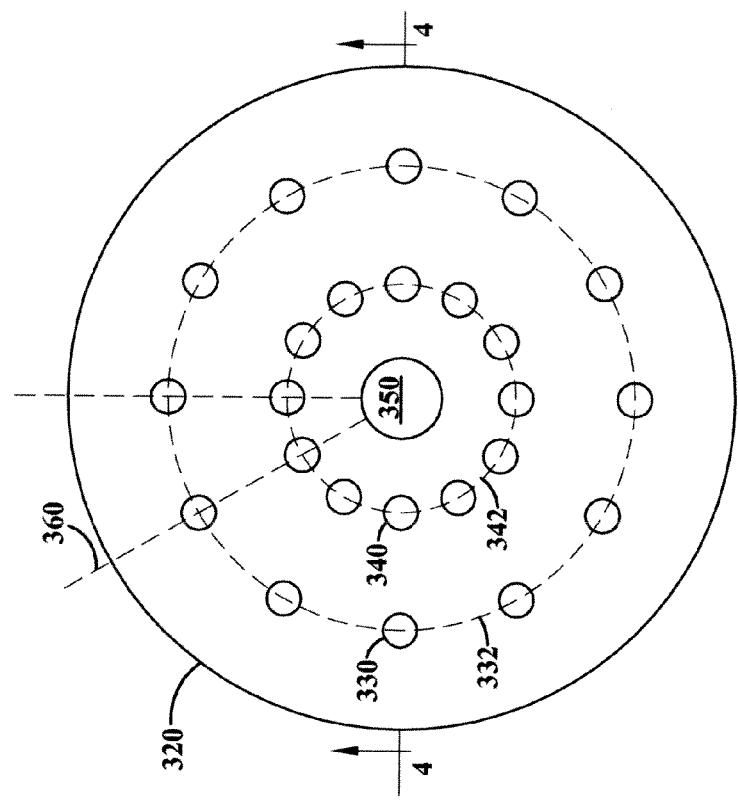
FIG. 3 is a plan view of the faces of a cone member.
Figure 3:
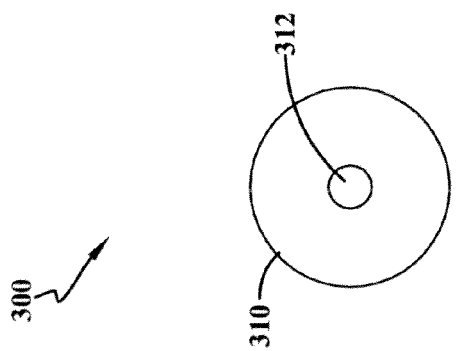

FIG. 3 shows the two flat faces of the second cone 300. The smaller flat face 310 is shown defining a bore opening 312. The large flat face 320 is shown defining a bore opening 350 as well as a plurality of indexing holes 330 arranged in a circle 332 concentric to the bore opening 350. The larger face 320 is also shown receiving a plurality of ball plungers 340 arranged in a smaller concentric circle 342. Furthermore, each ball plunger 340 is aligned with both the bore 350 and a corresponding index hole 330 along ray 360. Accordingly, when a ball plunger 340 seats in a receiving hole exactly one index hole 330 is simultaneously aligned with the index hole of the indexing plate.

Figure 4:
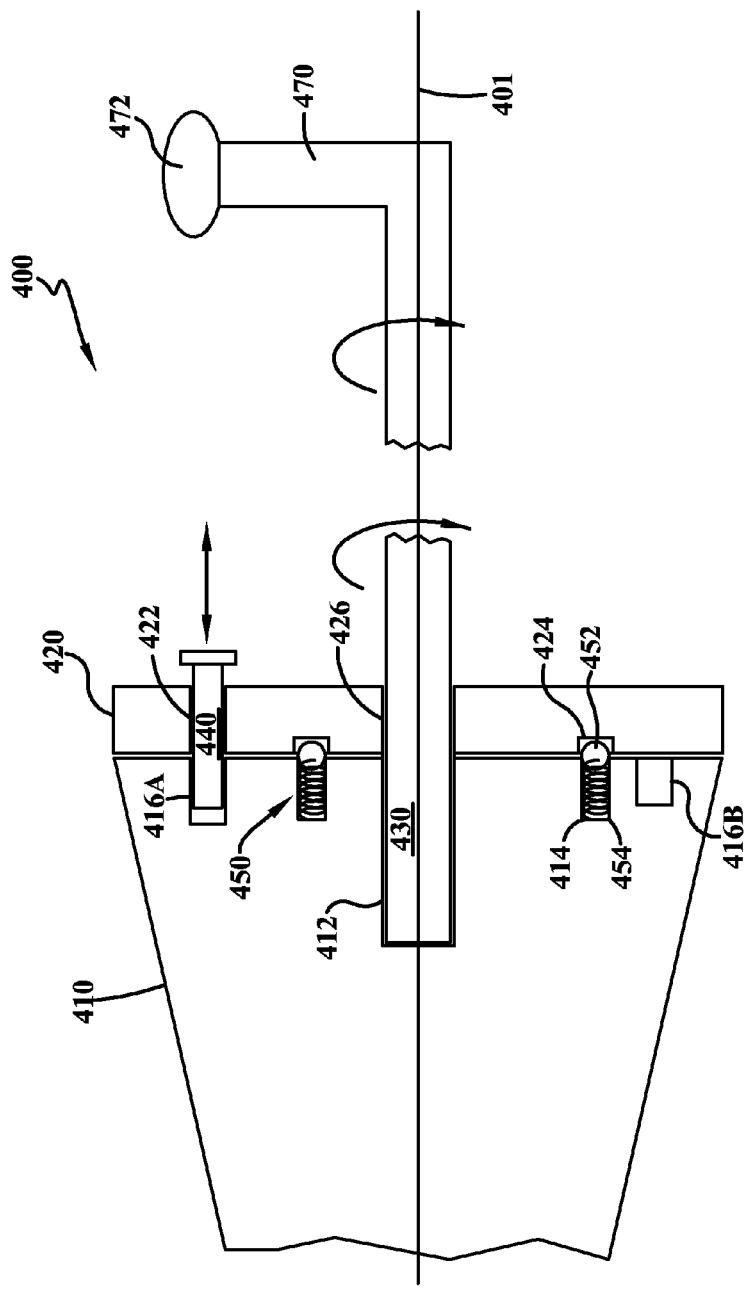
FIG. 4 is a cross sectional view of an assembly.
Figure 5:
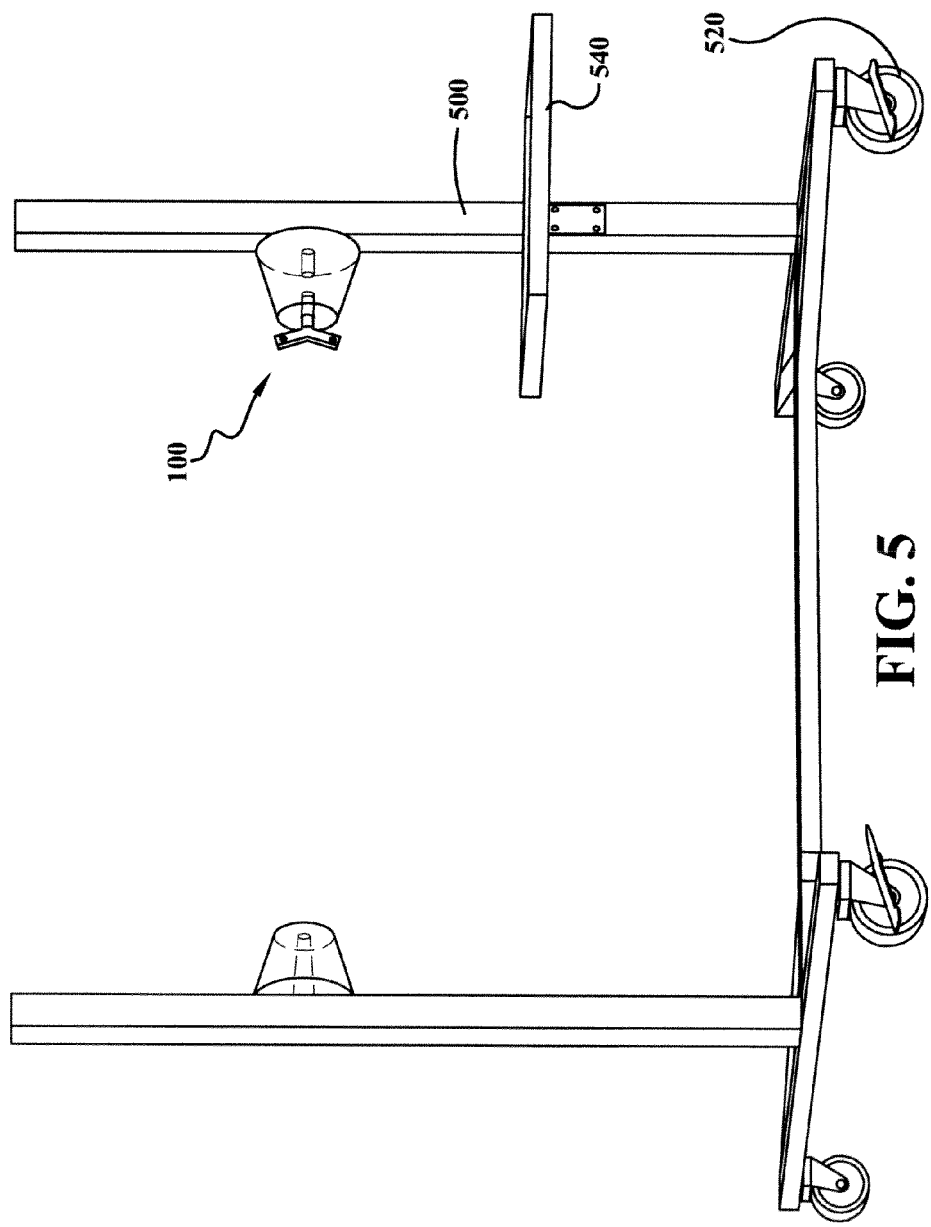
FIG. 5 is a perspective view showing a frame having a tool tray and locking casters.

FIG. 4 is a cross sectional view of an assembly 400 comprising the second cone 410, the indexing plate 420 and drive shaft 430. According to FIG. 4 the second cone 410 defines an indexing hole 416A, which is aligned with indexing hole 422 of the indexing plate 420. An indexing pin 440 is shown installed through the indexing hole 422 and in indexing hole 416A. An opposing indexing hole 416B is also shown in the second cone 410, but since it is not aligned with the indexing hole 422 of the index plate 420 it cannot receive a pin and is therefore shown empty. A pair of ball plungers 450 are also shown installed in the second cone 410. The ball plungers are installed in holes 414, and comprise a spring 454 and a steel ball 452. As shown, the ball plungers 450 are engaging the index plate 420 at ball seats 424 defined therein. Thus, as the index plate 420 rotates the balls 452 compress the springs 454 and retract into the holes 414. When the next seat 424 is properly aligned, the balls 452 spring back out and engage the seats 424. A drive shaft 430 is shown installed in the second cone 410 at bore 412. As shown, the drive shaft 430 is in a fixed relation to the cone 410, such as a press fit. Furthermore, the drive shaft 430 is shown passing through a hole 426 defined by the index plate 420, but the drive shaft 430 is not attached to the plate 420. Thus, when the drive shaft 430 rotates, it causes the cone 410 to rotate, but the plate 420 remains stationary. The drive shaft 430 is also shown in alignment with the longitudinal axis 401. The assembly 400 further includes a hand crank 470 having a grip 472 for manually turning the drive shaft 430. Although not shown, the assembly can also include gears, for instance, for providing a mechanical advantage, a ratcheting structure or any other appropriate structure.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. An automotive instrument panel assembly fixture, comprising:
    a frame adapted to support an automotive instrument panel assembly;
    an opposing pair of panel assembly support cones comprising a first cone and a second cone and defining a longitudinal axis, and the cones each having a conical face opposing that of the other, and each having a flat face in vertically supported and rotatable relations with the frame, wherein the opposing pair of cones is adapted to engage a panel assembly at opposing ends of the panel;
    the first cone further comprising a movable panel engagement pin, wherein the panel engagement pin has a range of motion coextensive with the longitudinal axis;
    the second cone further comprising a panel assembly engagement key adapted to fix the rotational orientation of an instrument panel assembly relative to the key, and the key being in an adjustable fixed relation with the second cone, the flat face of the second cone having a plurality of indexing holes evenly spaced in a concentric circular pattern, wherein the flat face of the second circular cone has a plurality of ball plungers evenly spaced in a concentric circular pattern;
    an indexing plate parallel to the flat face of the second cone, the indexing plate having a plurality of holes evenly spaced in a concentric circular pattern the holes adapted to each receive a ball of a ball plunger in an indexing relation, wherein the indexing plate additionally includes an indexing hole adapted to align with any of the indexing holes defined by the flat face of the second cone and adapted to receive an indexing pin, the indexing pin holding the second cone in a fixed indexing relation to the indexing plate; and
    a rotatable crank member in a fixed relation with the second cone and adapted to cause rotation of the second cone about the longitudinal axis.

2. The fixture of claim 1, wherein the frame comprises tubing having a rectangular cross section.

3. The fixture of claim 1, wherein the frame comprises a material selected from one or more of steel, stainless steel, or aluminum.

4. The fixture of claim 1, wherein each of the opposing pair of cones has a larger diameter from about 2 cm to about 30 cm, and a smaller diameter from about 0.5 cm to about 5 cm.

5. The fixture of claim 1, wherein the movable panel engagement pin of the first cone comprises a variable stroke plunger.

6. The fixture of claim 1, wherein the movable panel engagement pin has a continuous range of motion up to about one meter.

7. The fixture of claim 1, wherein the panel engagement key of the second cone is disposed in an orientation generally opposing the conical face of the first cone.

8. The fixture of claim 1, wherein the indexing holes define a circular pattern having a larger diameter than that of the ball plungers.

9. The fixture of claim 1, wherein the ball plungers are each adapted to mate simultaneously with a receiving hole defined by the indexing plate.

10. The fixture of claim 1, wherein the indexing plate is spaced apart from the flat face of the second cone by a distance less than the distance by which the ball plungers protrude from the flat face of the second cone.

11. The fixture of claim 1, wherein the indexing plate further defines a hole for receiving a drive shaft, the drive shaft being in a fixed relation to the second cone and the rotatable crank member.

12. The fixture of claim 1, further comprising a tool tray supported by the frame.

13. The fixture of claim 1, further comprising locking casters disposed on a bottom of the frame and spaced apart in a pattern suitable to support the frame, and enable the fixture to be rolled.

* * * * *